(12) United States Patent
Kobayashi (10) Patent No.: US 7,508,652 B2
(45) Date of Patent: Mar. 24, 2009

(54) SOLID ELECTROLYTIC CAPACITOR AND METHOD OF MAKING SAME

(75) Inventor: Masaaki Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 70 days.

(21) Appl. No.: 11/727,149

(22) Filed: Mar. 23, 2007

(65) Prior Publication Data
US 2007/0230091 A1   Oct. 4, 2007

(30) Foreign Application Priority Data
Mar. 31, 2006   (JP) .......................... P2006-098387

(51) Int. Cl.
*H01G 9/00* (2006.01)
(52) U.S. Cl. .................. 361/523; 361/516; 361/517; 361/525; 361/528; 361/529; 29/25.01; 29/25.03
(58) Field of Classification Search ............ 361/523, 361/525, 528–529, 534, 540–541, 516–519; 29/25.01, 25.03
See application file for complete search history.

(56) References Cited

U.S. PATENT DOCUMENTS

| | | | | |
|---|---|---|---|---|
| 3,579,813 | A | 5/1971 | Tomiwa | |
| 6,324,051 | B1 * | 11/2001 | Igaki et al. | 361/523 |
| 6,333,844 | B1 * | 12/2001 | Nakamura | 361/523 |
| 6,346,127 | B1 | 2/2002 | Kuriyama | |
| 6,411,498 | B2 * | 6/2002 | Nakamura | 361/523 |
| 6,507,482 | B2 * | 1/2003 | Harada et al. | 361/535 |
| 6,661,645 | B1 | 12/2003 | Sakai et al. | |
| 6,696,138 | B2 * | 2/2004 | Sakai et al. | 428/209 |
| 6,808,541 | B2 | 10/2004 | Maeda | |
| 6,813,140 | B1 | 11/2004 | Huntington | |
| 6,836,401 | B2 * | 12/2004 | Yoshida et al. | 361/538 |
| 6,873,518 | B2 * | 3/2005 | Masuda et al. | 361/525 |
| 6,912,117 | B2 * | 6/2005 | Arai et al. | 361/523 |
| 7,031,141 | B2 * | 4/2006 | Kuriyama | 361/528 |

FOREIGN PATENT DOCUMENTS

| | | |
|---|---|---|
| JP | A 2001-102252 | 4/2001 |
| JP | A 2005-108872 | 4/2005 |

* cited by examiner

*Primary Examiner*—Nguyen T Ha
(74) *Attorney, Agent, or Firm*—Oliff & Berridge, PLC (57) ABSTRACT

A solid electrolytic capacitor which is easy to make and a method of making the same are provided. In a solid electrolytic capacitor in accordance with the present invention, a substrate on which a capacitor device is mounted includes anode electrode parts and cathode electrode parts of a lead frame, and a resin plate, whereas parts exposed from the upper face of the resin plate construct anode electrode terminals and cathode electrode terminals. Therefore, this substrate can easily be made by mold-sealing the anode electrode parts and cathode electrode parts with the resin plate. Consequently, the solid electrolytic capacitor in accordance with the present invention using such a substrate can also be made easily.

2 Claims, 7 Drawing Sheets

SOLID ELECTROLYTIC CAPACITOR AND METHOD OF MAKING SAME

BACKGROUND OF THE INVENTION

1. Field of the Invention

The present invention relates to a solid electrolytic capacitor and a method of making the same.

2. Related Background Art

In general, capacitor devices used in solid electrolytic capacitors are made by employing a metal (so-called valve metal) such as aluminum, titanium, or tantalum capable of forming an insulating oxide film as an anode; anode-oxidizing a surface of the valve metal, so as to form an insulating oxide film; then forming a solid electrolyte layer made of an organic compound or the like substantially functioning as a cathode; and providing a conductive layer such as graphite or silver as a cathode.

As a substrate used for a solid electrolytic capacitor, a composite material substrate constituted by a composite material (FR4) made of a glass cloth and an epoxy resin is employed in general (see the following Japanese Patent Application Laid-Open No. 2001-102252). This composite material substrate is subjected to processing such as printing of wiring patterns and forming of via holes as appropriate, whereby a carrier substrate for actually carrying a capacitor device is obtained The above-mentioned capacitor device is carried on thus obtained carrier substrate, and the capacitor device and the carrier substrate are integrally sealed by molding.

SUMMARY OF THE INVENTION

In the conventional solid electrolytic capacitor mentioned above, however, an enormous amount of time and labor has been required for operations of processing the composite material substrate for use so as to make the carrier substrate. More specifically, for obtaining the carrier substrate, it is necessary to prepare a plate-like flat composite material substrate, and various operating steps such as the steps of (a) providing through holes for forming via holes, (b) filling the though holes with a conductor, (c) printing the substrate surface with a wiring pattern, and (d) coating a predetermined region with an insulating film are required for the prepared composite material substrate. Therefore, an enormous amount of labor and time has also been necessary for making a solid electrolytic capacitor using such a carrier substrate.

For solving the problem mentioned above, it is an object of the present invention to provide a solid electrolytic capacitor which is easy to make and a method of making the same.

The present invention provides a solid electrolytic capacitor comprising a capacitor device; a substrate, the capacitor device being mounted on the substrate, the substrate including a plurality of metal pieces and a resin, parts of the metal pieces being exposed from the resin and constructing a plurality of electrode terminals connected to an electrode part of the capacitor device; and a resin mold, the resin mold integrally sealing the capacitor device and the substrate together.

In this solid electrolytic capacitor, the substrate carrying the capacitor device includes metal pieces and a resin, whereas electrode terminals are constructed by the parts of metal pieces exposed from the resin. Therefore, this substrate can easily be made by mold-sealing the metal pieces with a resin. Consequently, the solid electrolytic capacitor in accordance with the present invention using such a substrate can also be made easily.

The present invention provides a method of making a solid electrolytic capacitor, the method comprising the steps of preparing a substrate including a plurality of metal pieces and a resin, parts of the metal pieces being exposed from the resin and constructing a plurality of electrode terminals; mounting a capacitor device on the substrate such that an electrode part of the capacitor device is connected to the plurality of electrode terminals of the substrate; and integrally sealing the capacitor device and the substrate by a resin mold.

In this method of making a solid electrolytic capacitor, the solid electrolytic capacitor is made by mounting a capacitor device onto a substrate including metal pieces and a resin. In this substrate, electrode terminals are constructed by the parts of metal pieces exposed from the resin. Therefore, this substrate can easily be made by mold-sealing the metal pieces with a resin. Consequently, the method of making a solid electrolytic capacitor in accordance with the present invention can easily make a solid electrolytic capacitor by using such a substrate.

DESCRIPTION OF THE PREFERRED EMBODIMENTS

In the following, modes which seem to be the best for carrying out the invention will be explained in detail with reference to the accompanying drawings. Constituents identical or equivalent to each other will be referred to with numerals identical to each other without repeating their overlapping descriptions if any.

First Embodiment

Figure 1:
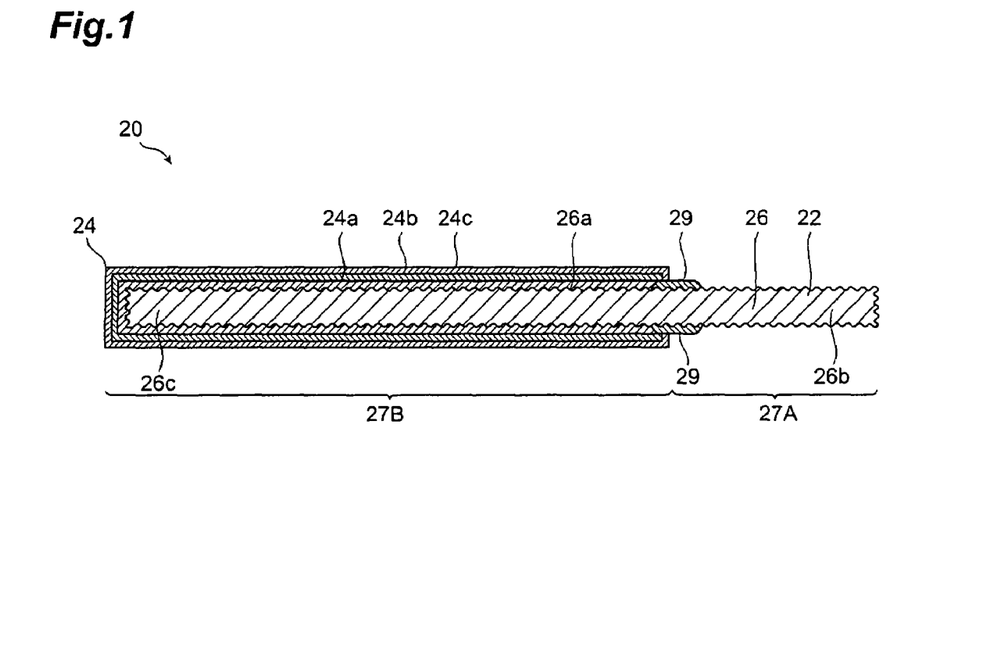
FIG. 1 is a schematic sectional view showing an inner structure of a capacitor device in accordance with a first embodiment of the present invention.

FIG. 1 is a schematic sectional view showing an inner structure of a two-terminal type capacitor device 20 included in a solid electrolytic capacitor 10 in accordance with a first embodiment of the present invention.

As shown in FIG. 1, the capacitor device 20 includes a foil-like valve metal support 26 constituted by aluminum which is a metal acting as a valve, whereas the valve metal support 26 is shaped like an oblong plate (e.g., 3.5 mm×6.5 mm). The surface of the valve metal support 26 is etched for increasing the surface area, so as to be roughened (caused to increase its area), thus becoming porous. This porous surface 26a as a whole is subjected to a chemical process (anode oxidation), so as to be formed with an insulating oxide film (dielectric layer) 28. This chemical process is performed, for example, by applying a voltage of 6 V to the valve metal support 26 in a state dipped in a chemical solution such as aqueous ammonium adipate solution.

A part of the valve metal support 26 on the side of one end part 26b (the end part on the right side of FIG. 1) in the longitudinal direction of the valve metal support 26 (in the transverse direction of FIG. 1) is an anode part 22. In the surface region of the valve metal support 26, the whole remnant region 27B (i.e., the region of the part extending from the left edge of the anode part 22 to the other end part 26c of the valve metal support 26) left by the surface region 27A formed with the anode part 22 is formed with a cathode part 24.

Figure 2:
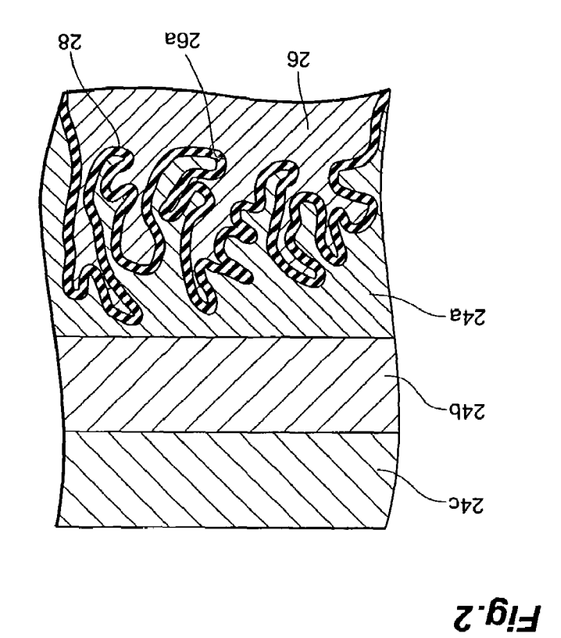
FIG. 2 is a schematic sectional view showing a cathode part of the capacitor device shown in FIG. 1.

The cathode part 24 has a three-layer structure shown in FIGS. 1 and 2. As mentioned above, the valve metal support 26 roughened by etching has the insulating oxide film 28 formed by the chemical process on its surface 26a. A solid polymer electrolyte layer (solid electrolyte layer) 24a containing a conductive polymer compound is further formed on the oxide film 28 so as to infiltrate into depressions of the valve metal support 26. The solid polymer electrolyte layer 24a is formed by dipping the valve metal support 26 with the oxide film 28 into a mixed solution made of 0.9 g of 3,4-ethylenedioxythiophene (BAYTRON M manufactured by Bayer AG), 10.81 g of an iron p-toluenesulfonate solution (BAYTRON C-B50 manufactured by Bayer AG), and 2.63 g of butanol, and then polymerizing them by chemical oxidation.

A graphite layer 24b having a thickness of 3 μm and an Ag layer 24c (conductor layer) having a thickness of 20 μm are successively formed on the solid polymer electrolyte layer 24a by immersion (dipping). The above-mentioned solid polymer electrolyte layer 24a, graphite layer 24b, and Ag layer 24c construct the cathode part 24 of the capacitor device 20. The graphite layer 24b and Ag layer 24c may also be formed by screen printing or spray coating when necessary.

Returning to FIG. 1, a resist 29 made of an insulating epoxy-based resin or the like is provided at the boundary between the surface region 27A of the anode part 22 and the region 27B formed with the cathode part 24. When dipping the valve metal support 26 in the solution for forming the solid polymer electrolyte layer 24a, the resist 29 prevents the solution from rising to the right side of FIG. 1 from a predetermined region because of capillary action in the porous surface of the valve metal support 26.

A procedure of making the solid electrolytic capacitor 10 in accordance with the first embodiment by using the foregoing capacitor device 20 will now be explained.

Figure 3:
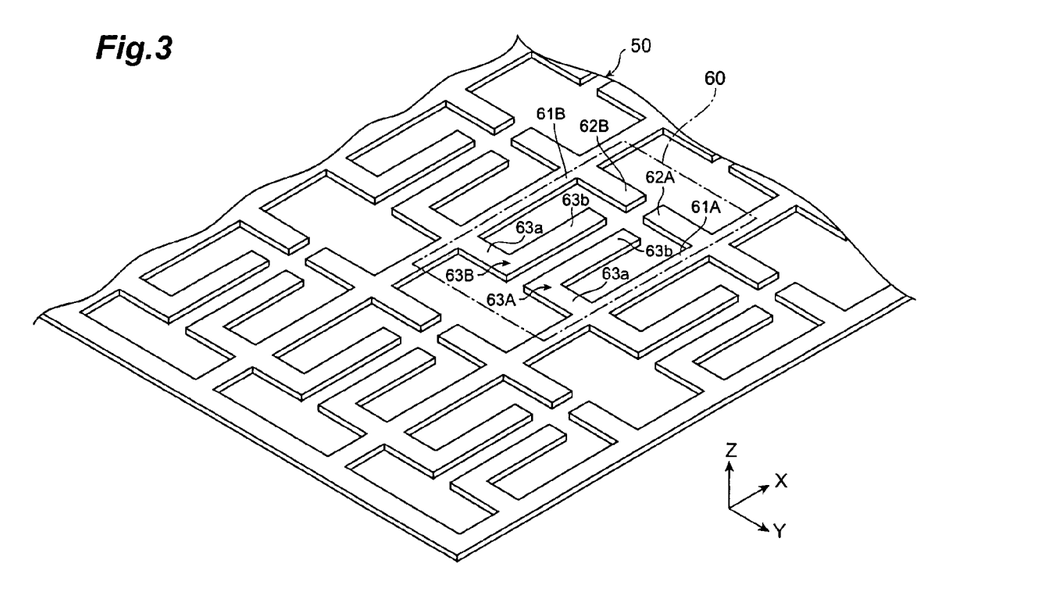
FIG. 3 is a view showing one of stages of making the solid electrolytic capacitor in accordance with the first embodiment.

As shown in FIG. 3, a lead frame 50 is used for making the solid electrolytic capacitor 10. This lead frame 50 is formed by punching a plate-like flat metal sheet (having a size of 10 cm×10 cm with a thickness of 0.05 to 0.3 mm) into a predetermined form as depicted. The lead frame 50 is constituted by copper, phosphor bronze, iron, nickel, or silver, for example. If necessary, one having a plated surface may be used. Depending on the punch-out form, the lead frame 50 may also be made by punching the metal sheet a plurality of times.

For convenience, the following will be explained while referring to the extending direction of the lead frame in surface directions of the lead frame as X direction, a direction orthogonal to the X direction in surface directions of the lead frame as Y direction, and the thickness direction of the lead frame as Z direction.

Such a lead frame 50 is used for making a plurality of (e.g., 200) solid electrolytic capacitors 10. Therefore, the lead frame 50 is sectioned into a plurality of unit regions to become individual solid electrolytic capacitors. Each unit region 60 is constituted by a pair of frame parts 61A, 61B, a pair of anode electrode parts 62A, 62B (metal pieces), and a pair of cathode electrode parts 63A, 63B (metal pieces).

The frame parts 61A, 61B are parts extending in parallel along the longitudinal direction (X direction of FIG. 3) while being separated from each other by a predetermined distance. The anode electrode parts 62A, 62B are parts extending in their approaching direction (Y direction in FIG. 3) from their corresponding positions in the frame parts 61A, 61B. The cathode electrode parts 63A, 63B are constituted by first parts 63a extending in their approaching direction (Y direction in FIG. 3) from their corresponding positions in the frame parts 61A, 61B different from the positions of the anode electrode parts 62A, 62B, and second parts 63b extending along the X direction in parallel from end parts of the first parts 63a toward the anode electrode parts 62A, 62B.

Figure 4:
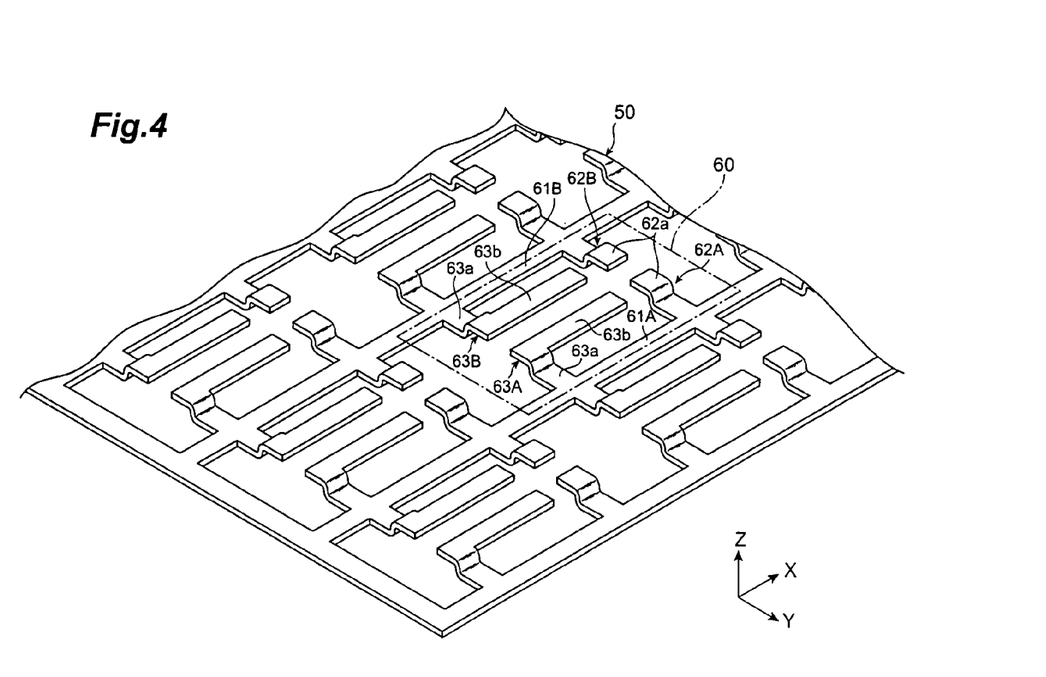
FIG. 4 is a view showing one of stages of making the solid electrolytic capacitor in accordance with the first embodiment.

Then, the lead frame 50 is subjected to a bending process. More specifically, in each unit region 60 of the lead frame 50, the anode electrode parts 62A, 62B are bent up such that their end parts 62a are parallel to the frame parts 61A, 61B, and the cathode electrode parts 63A, 63B are bent up such that their second parts 63b are parallel to the frame parts 61A, 61B as shown in FIG. 4.

Figure 5:
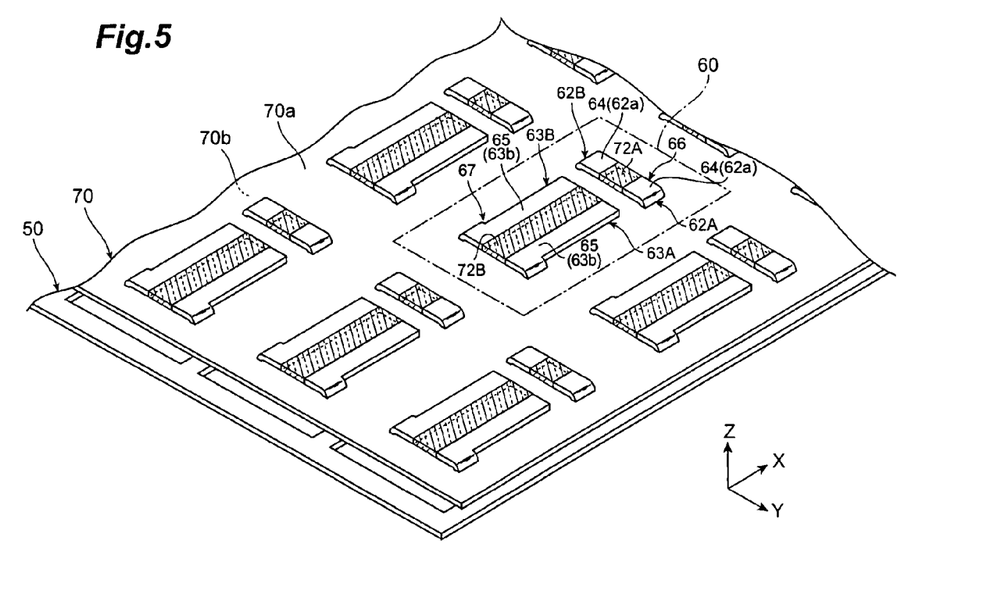
FIG. 5 is a view showing one of stages of making the solid electrolytic capacitor in accordance with the first embodiment.

Subsequently, a resin plate is attached to thus bent lead frame 50. More specifically, transfer molding of an epoxy resin is performed such that a flat resin plate 70 (having a thickness of 0.1 mm to 0.3 mm, for example) is attached to the whole surface of the lead frame 50 as shown in FIG. 5. An epoxy resin or the like can be used therefore in general. Fillers can be incorporated in the resin in order to adjust its strength and coefficient of thermal expansion. This resin may be either identical to or different from a resin constituting a resin mold which will be explained later. For example, CV8500B manufactured by Matsushita Electric Works, Ltd. can be used. In the transfer molding, its die is adjusted such that the end parts 62a of the anode electrode parts 62A, 62B and the second parts 63b of the cathode electrode parts 63A, 63B, which are bent up in the bending process, are exposed from the upper face 70a of the resin plate 70. Each of the end parts 62a of the anode electrode parts 62A, 62B exposed from the upper face 70a of the resin plate 70 becomes an anode electrode terminal 64 of the solid electrolytic capacitor 10 in accordance with this embodiment, whereas each of the second parts 63b of the cathode electrode parts 63A, 63B exposed from the resin plate 70 becomes a cathode electrode terminal 65 of the solid electrolytic capacitor 10 in accordance with this embodiment. The resin plate 70 is formed so as to come into contact with the upper face of the lead frame 50, whereas the frame parts 61A, 61B of the lead frame 50, the end parts of the anode electrode parts 62A, 62B on the side of the frame parts 61A, 61B, and the end parts of the cathode electrode parts 63A, 63B on the side of the frame parts 61A, 61B are exposed from the lower face 70b of the resin plate 70.

Figure 6:
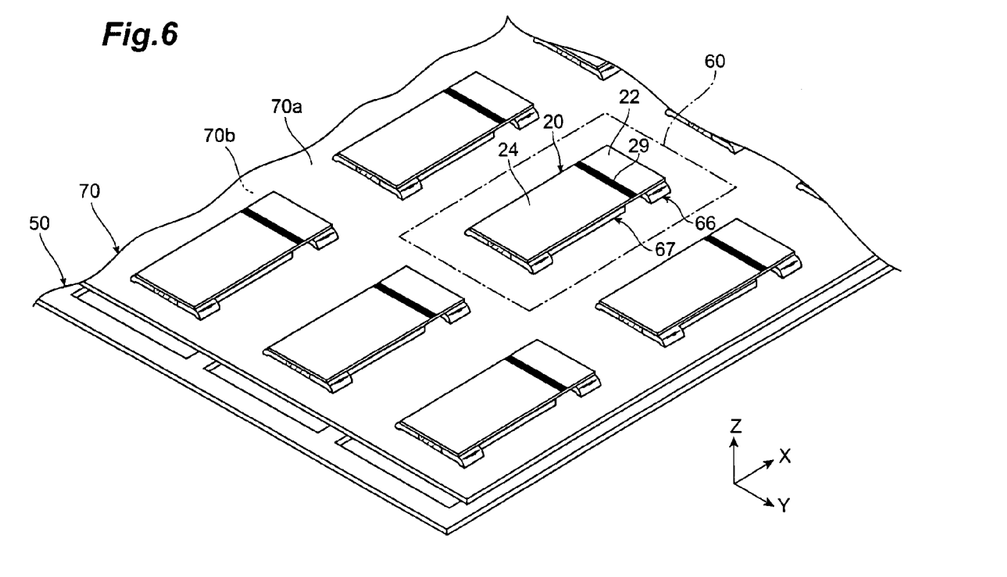
FIG. 6 is a view showing one of stages of making the solid electrolytic capacitor in accordance with the first embodiment.

Further, a conductive adhesive 72A (e.g., DOTITE XA874 manufactured by Fujikura Kasei Co., Ltd.) is applied by screen printing to a region held between a pair of anode electrode terminals 64 in the region of the upper face 70a of the resin plate 70, so as to electrically connect the anode electrode terminals 64 to each other. Similarly, a conductive adhesive 72B similar to the conductive adhesive 72A is applied to a region held between a pair of cathode electrode terminals 65 in the region of the upper face 70a of the resin plate 70, so as to electrically connect the cathode electrode terminals 65 to each other. Thus, even a circuit which is hard to be made by a lead frame alone can secondarily be added by using a conductive material (conductive adhesive, plating, or the like). Consequently, an anode electrode 66 constituted by a pair of anode electrode terminals 64 and the conductive adhesive 72A and a cathode electrode 67 constituted by a pair of cathode electrode terminals 66 and the conductive adhesive 72B are formed on the resin plate 70.

Figure 7:
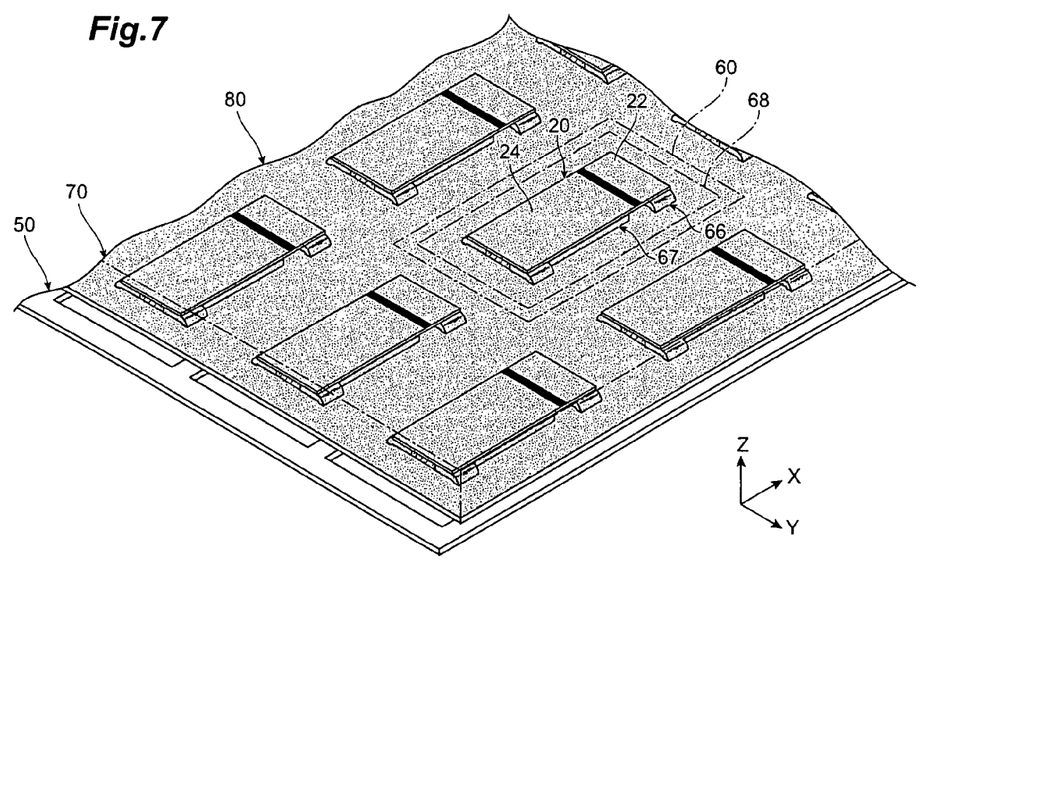
FIG. 7 is a view showing one of stages of making the solid electrolytic capacitor in accordance with the first embodiment.

Then, the above-mentioned capacitor device 20 is mounted to each unit region 60 formed with the anode electrode 66 and cathode electrode 67 in the resin plate 70. Here, the anode part 22 and cathode part 24 of the capacitor device 20 are connected to the anode electrode 66 and cathode electrode 67, respectively. Laser welding or the like is used for connecting the anode part 22 of the capacitor device 20 to the anode electrode 66, whereas a conductive adhesive or the like is used for connecting the cathode part 24 of the capacitor device 20 to the cathode electrode 67. Though a mode mounting only one capacitor device 20 is illustrated, it can be changed to a mode mounting a multilayer body made of a plurality of capacitor devices 20 as appropriate.

Figure 8:
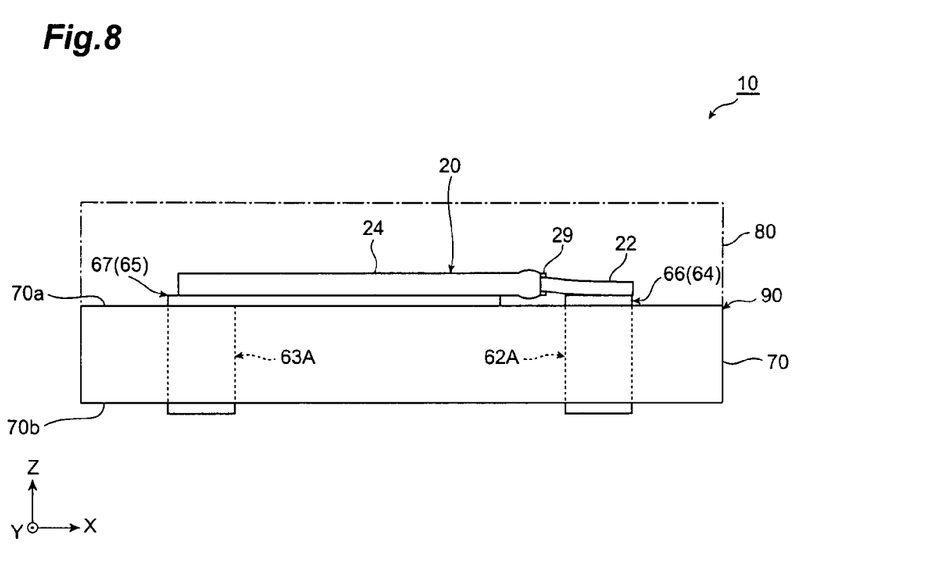
FIG. 8 is a side view showing the solid electrolytic capacitor in accordance with the first embodiment.

Thereafter, a resin mold 80 covering the capacitor device 20 is formed on the whole surface of the resin plate 70. The resin mold 80 has such a thickness (1.5 mm to 3.0 mm) as to completely cover the capacitor device 20, and is formed by transfer molding or casting of an epoxy resin or printing under reduced pressure. A liquid epoxy sealing resin CV5788MA manufactured by Matsushita Electric Works, Ltd. can be used, for example. Finally, each unit region 60 of the lead frame 50 is cut by dicing, whereby the solid electrolytic capacitor 10 in accordance with this embodiment is cut out. More specifically, cutting is done in a cutting region 68 (e.g., 7.3 mm×4.3 mm) in each unit region 60, so as to separate the frame parts 61A, 61B from the anode electrode parts 62A, 62B at their joining positions, and the frame parts 61A, 61B from the cathode electrode parts 63A, 63B at their joining positions. As a consequence, the anode electrode parts 62A, 62B and cathode electrode parts 63A, 63B separated from the lead frame 50 become metal pieces, whereby the solid electrolytic capacitor 10 in accordance with this embodiment shown in FIG. 8 is obtained.

More specifically, the solid electrolytic capacitor 10 comprises the capacitor device 20, a substrate 90 constituted by the resin plate 70 and the anode electrode parts 62A, 62B and cathode electrode parts 63A, 63B of the lead frame 50, and a resin mold 80 integrally sealing the capacitor device 20 and substrate 90 to each other. The parts exposed from the resin plate 70 (i.e., the end parts 62a of the anode electrode parts 62A, 62B and the second parts of the cathode electrode parts 63A, 63B) become the anode electrode terminals 64 and cathode electrode terminals 65 of the substrate 90, whereas these electrode terminals 64, 65 are connected to their corresponding electrode parts (i.e., anode part 22 and cathode part 24) of the capacitor device 20. On the other hand, the end parts of the anode electrode parts 62A, 62B and end parts of the cathode electrode parts 63A, 63B exposed from the lower face 70b of the resin plate 70 in the substrate 90 function as anode terminals and cathode terminals connected to terminals of a packaging substrate or the like.

As explained in detail in the foregoing, the substrate 90 of the solid electrolytic capacitor 10 can easily be made by mold-sealing the lead frame 50 deformed into a predetermined form with a resin. More specifically, this greatly cuts down operating steps as compared with those for conventional composite material substrates requiring various operating steps such as the steps of (a) providing through holes for forming via holes, (b) filling the though holes with a conductor, (c) printing the substrate surface with a wiring pattern, and (d) coating a predetermined region with an insulating film. The manufacturing cost is also cut down accordingly. Therefore, the solid electrolytic capacitor 10 using such a substrate 90 is also made easily.

Second Embodiment

A solid electrolytic capacitor 110 in accordance with a second embodiment of the present invention will now be explained. The second embodiment mainly differs from the first embodiment in the form of the capacitor device and the punching form of the lead frame.

Figure 9:
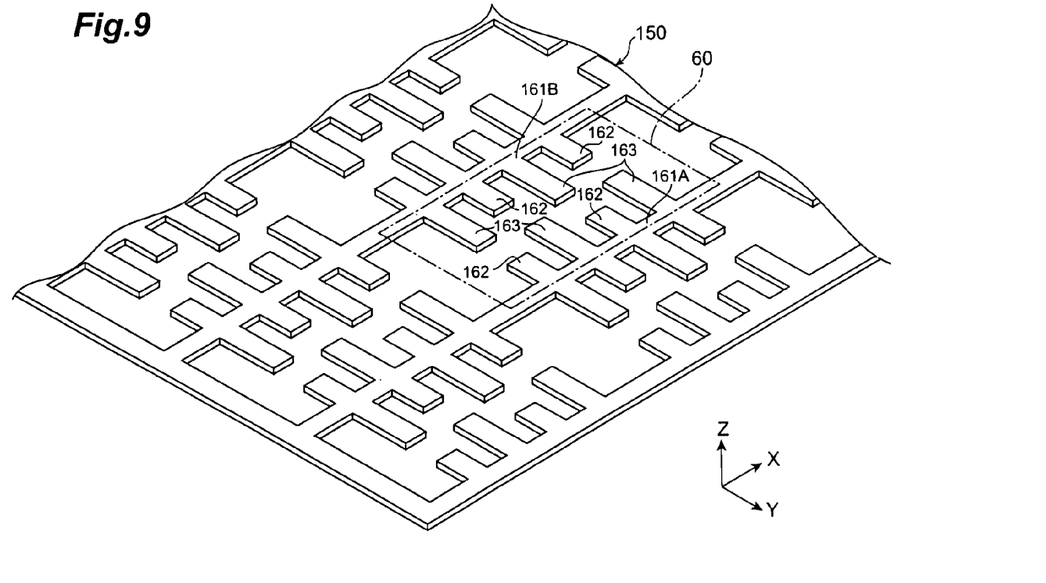
FIG. 9 is a view showing one of stages of making the solid electrolytic capacitor in accordance with a second embodiment.

More specifically, in this embodiment, each unit region 160 of a lead frame 150 is constituted by a pair of frame parts 161A, 161B and four pairs of anode electrode parts and cathode electrode parts.

As with the frame parts 61A, 61B in accordance with the first embodiment, the fame parts 161A, 161B extend in parallel along the longitudinal direction (X direction in FIG. 3) of the lead frame while being separated from each other. Anode electrode parts (metal pieces) 162 and cathode electrode parts (metal pieces) 163 extend from their corresponding four equally-spaced positions each in the frame parts 161A, 161B so as to approach each other. In each of the frame parts 161A, 161B, the anode electrode parts 162 and cathode electrode parts 163 project alternately with each other. The cathode electrode parts 163 project longer than the anode electrode parts 162.

Figure 10:
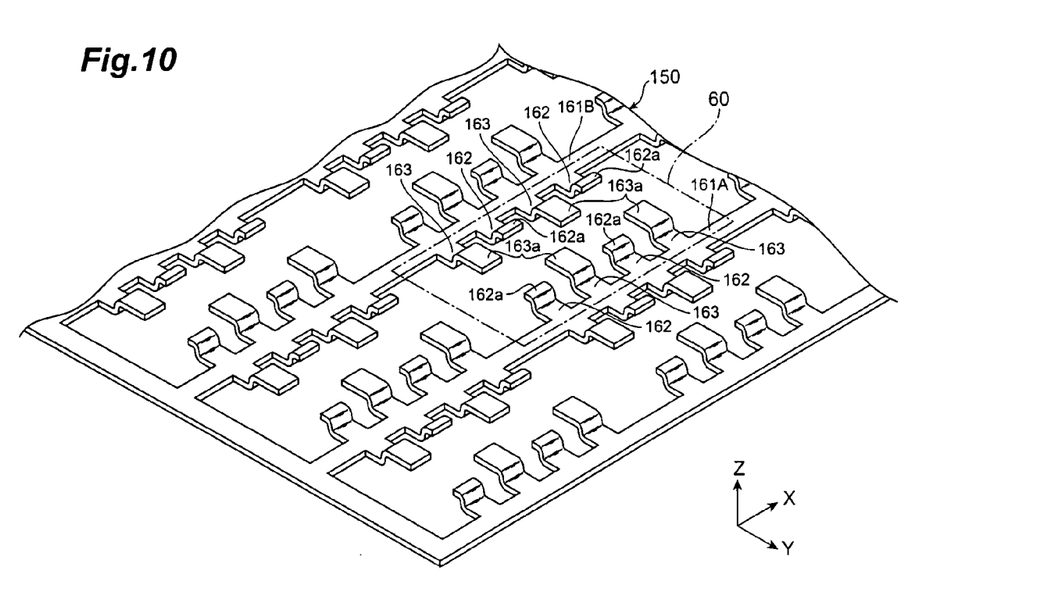
FIG. 10 is a view showing one of stages of making the solid electrolytic capacitor in accordance with the second embodiment.

The electrode parts 162 and cathode electrode parts 163 are subjected to a bending process as with the anode electrode parts 62A, 62B of the first embodiment. More specifically, in each unit region 60 in the lead frame 150, the anode electrode parts 162 are bent up such that their end parts 162a are parallel to the frame parts 161A, 161B, and the cathode electrode parts 163 are bent up such that their end parts 163a are parallel to the frame parts 161A, 161B as shown in FIG. 10.

Figure 11:
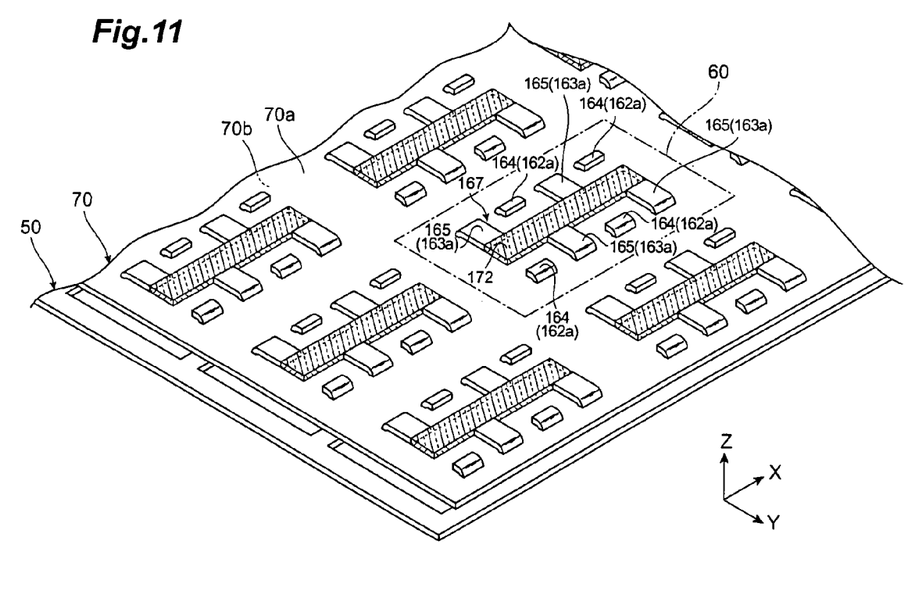
FIG. 11 is a view showing one of stages of making the solid electrolytic capacitor in accordance with the second embodiment.

Subsequently, as in the first embodiment, a resin plate 70 is attached to the whole surface of the lead frame 150 such that the end parts 162a of the anode electrode parts 162 and the end parts 163a of the cathode electrode parts 163 are exposed from the resin plate 70 as shown in FIG. 11. The end parts 162a of the anode electrode parts 162 exposed from the resin plate 70 become anode electrode terminals 164 of the solid electrolytic capacitor 110 in accordance with this embodiment, whereas the end parts 163a of the cathode electrode parts 163 exposed from the resin plate 70 become cathode electrode terminals 165 of the solid electrolytic capacitor 110 in accordance with this embodiment. The resin plate 70 is formed so as to come into contact with the upper face 80a of the lead frame 150, whereas frame parts 161A, 161B of the lead frame 150, end parts of the anode electrode parts 162 on the side of the frame parts 161A, 161B, and end parts of the cathode electrode parts 163 on the side of the frame parts 161A, 161B are exposed from the lower face 70b of the resin plate 70.

Figure 12:
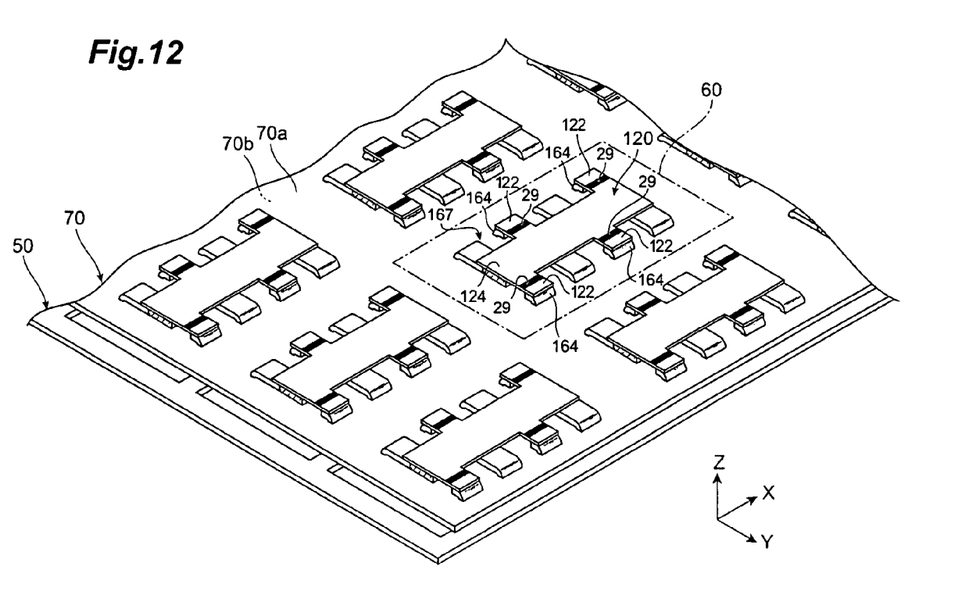
FIG. 12 is a view showing one of stages of making the solid electrolytic capacitor in accordance with the second embodiment.

Further, a conductive adhesive 172 is applied by screen printing to a rectangular region formed by four cathode electrode terminals 165 in the region of the upper face 70a of the resin plate 70, so as to electrically connect the four cathode electrode terminals 165 to each other. Consequently, a cathode electrode 167 in which the four cathode electrode terminals 165 are connected to each other by the conductive adhesive 172 is formed on the resin plate 70.

Figure 13:
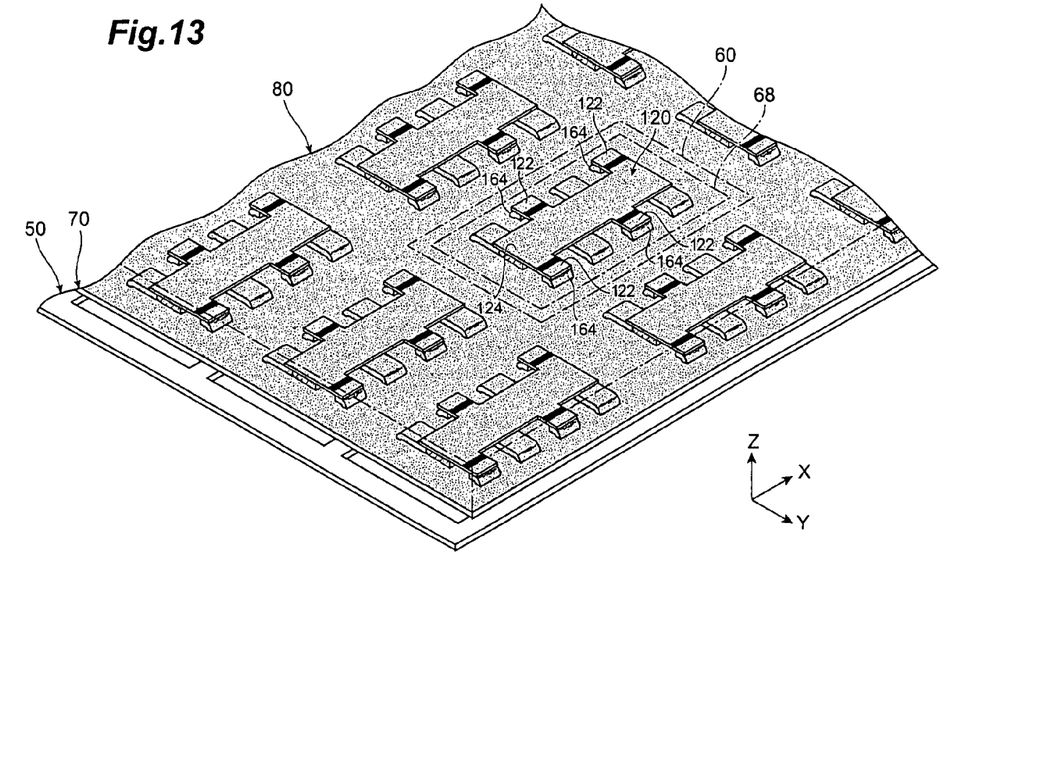
FIG. 13 is a view showing one of stages of making the solid electrolytic capacitor in accordance with the second embodiment.

Then, an eight-terminal type capacitor device 120 in accordance with the second embodiment is mounted to each unit region 60 formed with four anode electrode terminals 164 and the cathode electrode 167 in the resin plate 70. The capacitor device 120 has a form in which two rectangular parts project from each of opposing longer-side end parts of an oblong thin piece, thereby yielding four rectangular parts corresponding to the anode part of the capacitor device 20, whereas a cathode part 124 similar to that of the capacitor device 20 is formed on the remaining surface of the oblong part. More specifically, the capacitor device 120 has four anode parts 122 and one cathode part 124 (corresponding to the cathode part 24 in the first embodiment), whereas a resist 29 is provided at the boundary between the surface region of each anode part 122 and the region formed with the cathode part 124.

Laser welding or the like is used for connecting the anode part 122 of the capacitor device 120 to the anode electrode terminals 164, whereas a conductive adhesive or the like is used for connecting the cathode part 124 of the capacitor device 120 to the cathode electrode 167.

Figure 14:
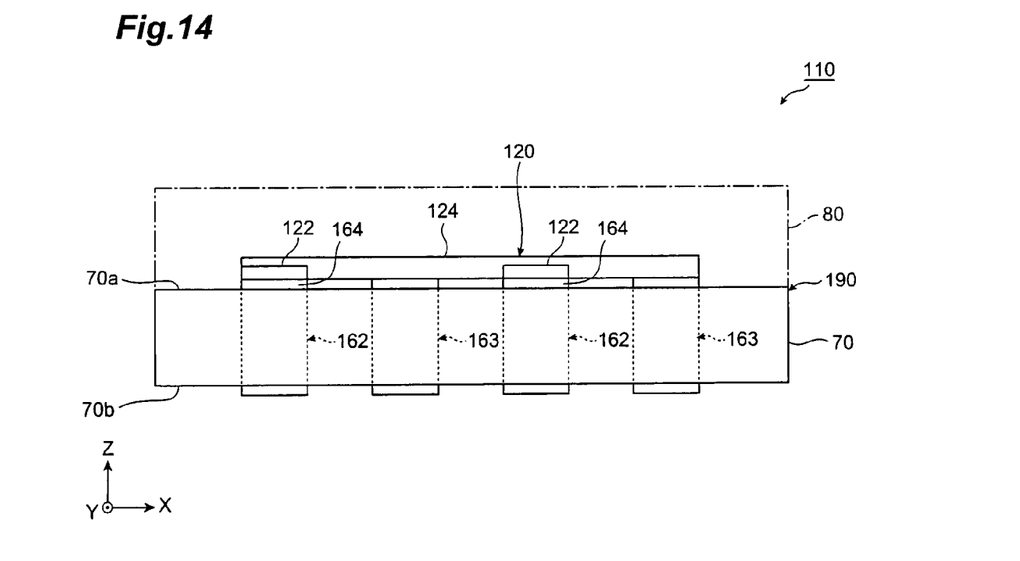
FIG. 14 is a view showing one of stages of making the solid electrolytic capacitor in accordance with the second embodiment.

Thereafter, a resin mold 80 covering the capacitor device 120 is formed on the whole surface of the resin plate 70. Finally, each unit region 60 of the lead frame 150 is cut by dicing, whereby the solid electrolytic capacitor 110 in accordance with this embodiment is cut out. More specifically, cutting is done in a cutting region 68 in each unit region 60, so as to separate the frame parts 161A, 161B from the anode electrode parts 162 at their joining positions, and the frame parts 161A, 161B from the cathode electrode parts 163 at their joining positions. As a consequence, the anode electrode parts 162 and cathode electrode parts 163 separated from the lead frame 150 become metal pieces, whereby the solid electrolytic capacitor 110 in accordance with this embodiment shown in FIG. 14 is obtained.

More specifically, as with the solid electrolytic capacitor 10 in accordance with the first embodiment, the solid electrolytic capacitor 110 in accordance with the second embodiment comprises the capacitor device 120, a substrate 190 constituted by the resin plate 70 and the anode electrode parts 162 and cathode electrode parts 163 of the lead frame 150, and a resin mold 80 integrally sealing the capacitor device 120 and substrate 190 to each other. The parts exposed from the resin plate 70 (i.e., the end parts 162a of the anode electrode parts 162 and the end parts 163a of the cathode electrode parts 163) become the anode electrode terminals 164 and cathode electrode terminals 165 of the substrate 190, whereas these electrode terminals 164, 165 are connected to their corresponding electrode parts (i.e., anode part 122 and cathode part 124) of the capacitor device 120. On the other hand, the end parts of the anode electrode parts 162 and end parts of the cathode electrode parts 163 exposed from the lower face 70b of the resin plate 70 in the substrate 190 function as anode terminals and cathode terminals connected to terminals of a packaging substrate or the like.

As explained in detail in the foregoing, the substrate 190 of the solid electrolytic capacitor 110 can also be made easily by mold-sealing the lead frame 150 deformed into a predetermined form with a resin. Therefore, the solid electrolytic capacitor 110 using such a substrate 190 is also made easily.

The present invention provides a solid electrolytic capacitor which is easy to make and a method of making the same.

What is claimed is:

1. A solid electrolytic capacitor comprising:
    a capacitor device;
    a substrate, the capacitor device being mounted on the substrate, the substrate including a plurality of metal pieces and a resin plate, the plurality of metal pieces having first and second end portions which are bent; and
    a resin mold, the resin mold integrally sealing the capacitor device and the substrate together,
    wherein the resin plate is attached to the metal pieces such that the first and second end portions of the metal pieces are exposed from the resin plate and portions of the plurality of metal pieces between the first and second end portions are placed in the resin plate, and
    wherein the first end portions of the plurality of metal pieces are connected to an electrode part of the capacitor device.

2. A method of making a solid electrolytic capacitor, the method comprising the steps of:
    preparing a lead frame including a unit region;
    bending end portions of the unit region;
    attaching a resin plate to the lead frame such that the end portions of the unit region are exposed from the resin plate;
    mounting a capacitor device on the resin plate such that an electrode part of the capacitor device is connected to the end portions of the lead frame; and
    integrally sealing the capacitor device, the end portions of the unit region, and the resin plate by a resin mold.

* * * * *